2 Sheets--Sheet 1.

W. A. SPRINGER.

The Art of Trimming the Edges of Material while being Sewed or Stitched.

No. 6,593. Reissued Aug. 10, 1875.

Witnesses;
Edward F. Johnson
Fred L. Fulton

Inventor;
William A. Springer.

N. PETERS, PHOTO-LITHOGRAPHER, WASHINGTON, D. C.

W. A. SPRINGER.

The Art of Trimming the Edges of Material while being Sewed or Stitched.

No. 6,593. Reissued Aug. 10, 1875.

*Witnesses;*

Edward F. Johnson

Fred L. Fitton

*Inventor;*

William A. Springer

N. PETERS, PHOTO-LITHOGRAPHER, WASHINGTON, D. C.

UNITED STATES PATENT OFFICE.

WILLIAM A. SPRINGER, OF MARLBOROUGH, MASSACHUSETTS.

IMPROVEMENT IN THE ART OF TRIMMING THE EDGES OF MATERIAL WHILE BEING SEWED OR STITCHED.

Specification forming part of Letters Patent No. 147,441, dated February 10, 1874; reissue No. 6,038, dated October 13, 1874; reissue No. 6,593, dated August 10, 1875; application filed March 18, 1875.

DIVISION B.

*To all whom it may concern:*

Be it known that I, WILLIAM A. SPRINGER, of Marlborough, in the county of Middlesex and Commonwealth of Massachusetts, have invented certain new and useful improvements in the art of trimming the edges of material while in process of being sewed or stitched together upon a sewing-machine; and I do hereby declare that the following, taken in connection with the drawings which accompany and form part of this specification, is a description of my improved mode or process sufficient to enable those skilled in the art to practice it.

The drawings represent a machine the mechanism of which illustrates one good and practical way of carrying out my said invention.

Figure 1:
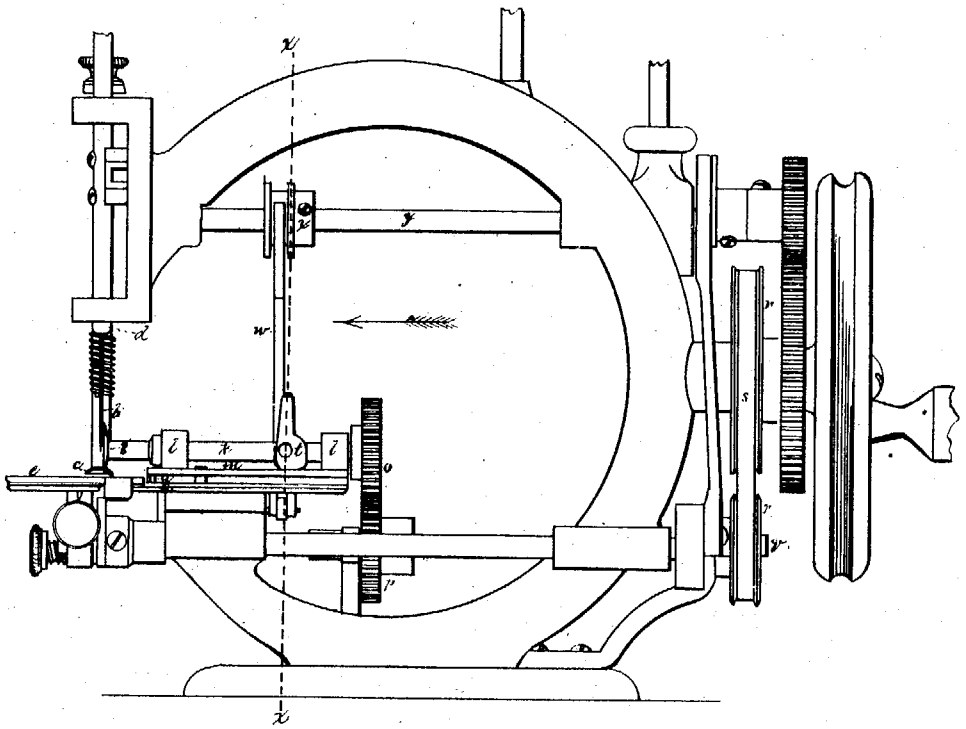
Figure 2:
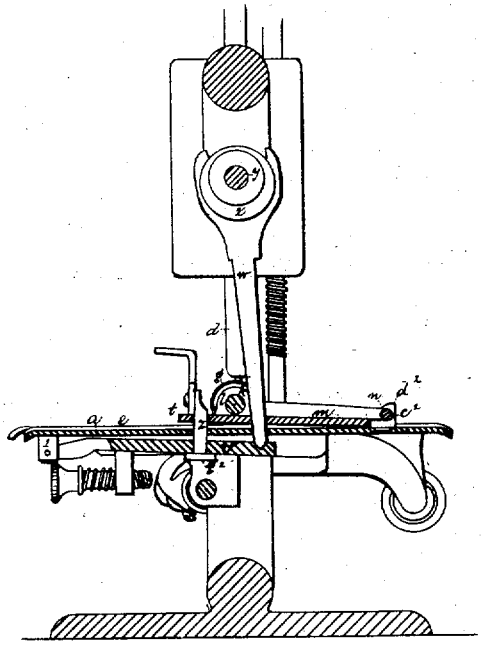
Figure 3:
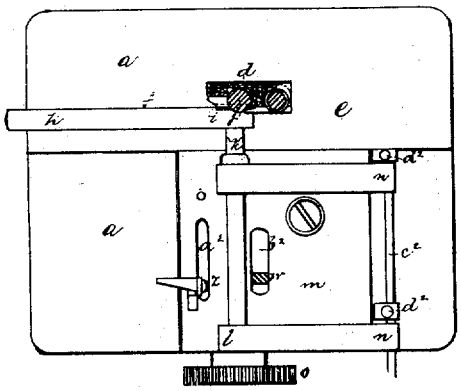

Figure 1 shows and represents a side elevation of the machine. Fig. 2 represents a vertical section on line *x x*, Fig. 1, and Fig. 3 represents a plan or top view of the work-plate and the mechanism thereon.

In the drawings, the part marked *a* denotes the work-plate, *b* the needle, *c* the presser-foot, *d* the needle-bar, of an ordinary sewing-machine.

The front part of the work-plate is shown as covered by a thin plate, *e*, in which is made a narrow slot or groove, *f*, the front wall of which forms an edge against which the straight face of the cutter-wheel *g*, or the edge of such wheel, runs to cut with a shear-cut. This groove or slot I prefer to make by forming the plate *e* with a long slot, one wall of which makes the wall against which the cutter plays, and with a slide, *h*, running into this slot, the slot being cut away at *i* to form the groove, the edge *j* forming one wall thereof. The cutter *g* is fixed upon the end of a shaft, *k*, turning in bearings *l* on a plate, *m*, which plate is hinged at *n*. The opposite end of the shaft bears a gear, *o*, which meshes into and is driven by a gear, *p*, on a shaft, *q*, connected to the driving-shaft by pulleys *r r* and belt *s*. The plate *m* can swing up and back on the hinge-pin or fulcrum $c^2$, and is pressed up against a stop-lever, *t*, by a suitable spring, *u*. Under the work-plate *a* is a lever, *v*, hinged at 1, and connected by a link or intermediate arm, *w*, with an eccentric, *x*, on the needle-driving shaft *y*, and from this lever extends an arm, *z*, to which the stop-lever *t* is jointed, the arm extending through the work-plate and through a slot, $a^2$, in a hinged plate, while the lower end of the link or intermediate arm *w* extends through the work-plate and through a slot, $b^2$, in the hinged plate. As the shaft *y*, in turning, throws down the needle the eccentric depresses the link or intermediate arm *w*, and the link or intermediate arm *w* the lever *v*, the lever, by its connection with the stop-lever *t*, against which the spring bears the hinged plate, and thereby carrying the cutter-shaft and cutter down, the descent of the cutter being after the feed of the work, so that the cutter acts both by its downward and forward movement as well as by its rotative movement. As the shaft *y* turns to raise the needle the eccentric permits the link or intermediate arm *w* to rise, and the spring throws up the hinged plate and the cutter, the rise taking place before the work is fed. By turning the lever *t* down to the plate *m* the plate will be raised by its spring sufficiently to permit the work to be readily introduced beneath the cutter-wheel. The plate *m* is hinged to a fulcrum-pin, $c^2$, extending through ears or bearings $d^2$, and when the plate is raised it may be slid back upon the pin $c^2$, the slots $a^2$ $b^2$ permitting the plate to move laterally. When thus moved work may be introduced over the greater part of the surface of the work-plate for common sewing, or when there is to be no trimming, and by withdrawing the pin $c^2$ and the pin *z* and nut $g^2$, the plate *m* and link or intermediate arm *w* may be wholly removed, and also the bearings $d^2$, each of which is made with a screw-shank, which is screwed into a nut-thread in the work-plate.

It will be observed from the foregoing description that as the cutter is swung up and back upon a fulcrum near one edge of the table that the cutter, while working in the line of the feed, is moved back and forth to do its work, and alternating in such work with the feed, and that it works independently of the needle-arm, and also that when it moves against the work it commences to cut upon the line where it left off at the previous cut, and that, too, upon an inclined or beveling line of cut, which is continued until the cutter is again moved back to give the feed a free chance to operate while the cutter is out of action or contact with the material. By this mode or process of operation an even and true cut is made, and the uneven or surplus material is cut or trimmed off by a series of gradual cuts, thus avoiding an undue twisting strain upon the material.

What I claim as my invention, and desire to have secured by Letters Patent in this division of reissue, is—

The described improvement in the art of trimming or cutting the edge or edges of a material being sewed or stitched in a sewing-machine, which consists in operating upon said material at stated times (alternating with the feed) with a rising and falling rotating cutter that cuts the material with a draw and shear cut in a line parallel with the line of stitching, as set forth.

WILLIAM A. SPRINGER.

Witnesses:
EDWARD F. JOHNSON,
FRED. L. FELTON.